United States Patent
Galang

(10) Patent No.: US 10,766,479 B2
(45) Date of Patent: Sep. 8, 2020

(54) SOUND AND VIBRATION ENHANCEMENT IN HYBRID VEHICLES

(71) Applicant: Toyota Motor Engineering & Manufacturing North America, Inc., Plano, TX (US)

(72) Inventor: Abril A. Galang, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 200 days.

(21) Appl. No.: 16/103,285

(22) Filed: Aug. 14, 2018

(65) Prior Publication Data

US 2020/0055513 A1    Feb. 20, 2020

(51) Int. Cl.
   *B60W 10/06*    (2006.01)
   *B60W 10/08*    (2006.01)
   *B60W 20/15*    (2016.01)

(52) U.S. Cl.
   CPC ............ *B60W 20/15* (2016.01); *B60W 10/06* (2013.01); *B60W 10/08* (2013.01); *B60L 2240/12* (2013.01); *B60Y 2200/92* (2013.01)

(58) Field of Classification Search
   CPC ...... B60W 20/15; B60W 10/06; B60W 10/08; B60L 2240/12; B60Y 2200/92
   See application file for complete search history.

(56) References Cited

U.S. PATENT DOCUMENTS

| | | | |
|---|---|---|---|
| 5,371,802 A | 12/1994 | McDonald et al. | |
| 5,635,903 A | 6/1997 | Koike et al. | |
| 8,320,581 B2 | 11/2012 | Hera et al. | |
| 8,331,580 B2 | 12/2012 | Isozaki | |
| 8,542,844 B2 | 9/2013 | Bowden et al. | |
| 8,783,395 B2* | 7/2014 | Sauvlet | B60K 6/48 180/65.28 |
| 8,862,299 B2 | 10/2014 | Ricci | |
| 9,352,688 B2* | 5/2016 | Tanaka | B60W 50/0098 |
| 9,686,611 B2 | 6/2017 | Violi et al. | |
| 9,815,404 B2 | 11/2017 | Peachey et al. | |
| 9,860,667 B2 | 1/2018 | Barlow, Jr. et al. | |
| 2013/0022215 A1* | 1/2013 | Kapus | B60Q 9/00 381/86 |
| 2013/0218383 A1* | 8/2013 | Martin | B60K 6/46 701/22 |
| 2014/0233745 A1* | 8/2014 | Kanehara | B60L 15/20 381/61 |
| 2014/0236405 A1* | 8/2014 | Wakashiro | B60L 50/10 701/22 |
| 2018/0148065 A1* | 5/2018 | Jacoby | B60K 6/36 |
| 2019/0263386 A1* | 8/2019 | Fugel | B60W 10/06 |

* cited by examiner

*Primary Examiner* — Bryan A Evans
(74) *Attorney, Agent, or Firm* — Haynes and Boone, LLP

(57) ABSTRACT

A system and method counters the "rubber band-like effect" in hybrid vehicles by introducing engine noise and/or vibration into a vehicle compartment when the engine reaches a threshold or maximum RPM, but the electric motor continues to provide additional power to increase vehicle speed. An acoustic tube coupling the engine to the passenger compartment is used to simulate the increased engine noise. Vibration mechanisms in the passenger compartment are used to simulate the engine vibration in the passenger compartment.

20 Claims, 3 Drawing Sheets

SOUND AND VIBRATION ENHANCEMENT IN HYBRID VEHICLES

FIELD OF THE DISCLOSURE

The present disclosure generally relates to hybrid vehicles and, more particularly, to systems and methods of enhancing sound and/or vibration in a hybrid vehicle in a manner corresponding to vehicle speed.

BACKGROUND

Hybrid vehicles employ both an internal combustion engine and electric motor to drive the vehicle, and have become commonplace on streets and roadways. However, a phenomenon known as the "rubber band effect" accompanies use of certain combustion engine vehicles equipped with continuously variable transmissions ("CVTs"). A "rubber band-like effect" also accompanies the use of hybrid vehicles equipped with electronic CVTs. The rubber band-like effect is an uncomfortable sensation one has when accelerating in a hybrid vehicle because the engine noise/vibration that typically accompanies increased speed remains constant. As the hybrid vehicle accelerates, the vehicle occupants can physiologically feel the increased speed because the electric motor is providing increased power to the wheels. However, once the engine has reached its maximum revolutions per minute ("RPM") (which corresponds to a plateau of engine noise and vibration), there is no corresponding further increase in engine noise/vibration even though the vehicle may continue to increase in speed. This continuing acceleration on a vehicle occupant without a corresponding change in the vehicle environment, such as a tactile, audible, or other environmental change, can result in the uncomfortable physiological response. That is, unlike a traditional combustion engine-only vehicle, even though the hybrid vehicle is increasing in speed, the engine noise or vibration does not increase, thereby resulting in the rubber band-like effect.

SUMMARY

In consideration of the above-described disadvantages, the present disclosure provides a computer-implemented method for operating a hybrid vehicle having an internal combustion engine and electric motor. During operation of the hybrid vehicle, engine RPM and vehicle speed data are obtained using a hybrid control unit. The engine is monitored to detect when an engine RPM threshold has been met. The hybrid control unit continues to monitor the vehicle data to detect an increase in the vehicle speed after the engine RPM threshold has been met. The increase in the vehicle speed is caused by the electric motor. In response to the increase in vehicle speed beyond the engine RPM threshold, the hybrid control unit introduces engine noise into the passenger compartment through an acoustic tube that acoustically couples the engine to the passenger compartment. Alternatively, in response to the increase in vehicle speed beyond the engine RPM threshold, the hybrid control unit introduces vibration into the passenger compartment.

In certain illustrative methods, the hybrid control unit adjusts an amount of engine noise allowed to travel through the acoustic tube as a function of the vehicle speed. Alternatively, the hybrid control unit may adjust the amount of vibration introduced into the passenger compartment as a function of the vehicle speed. The vibrations may be introduced using vibration mechanisms positioned inside the passenger compartment. The vibration mechanisms may form part of the steering wheel, acceleration pedal, or vehicle seats. Moreover, in other methods, the introduction of vibration into the passenger compartment is achieved by reducing damping of a vehicle vibration damping system.

In other embodiments of the present disclosure, a system for operating a hybrid vehicle is provided having an internal combustion engine and electric motor. The system further includes a non-transitory memory and a hardware processor coupled to the engine, electric motor, and non-transitory memory. The processor is configured to read instructions from the non-transitory memory to cause the system to perform operations described herein. In addition, other aspects of the present disclosure provide non-transitory computer-readable media having stored thereon machine-readable instructions executable to cause a machine to perform the operations described herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DESCRIPTION OF ILLUSTRATIVE EMBODIMENTS

Illustrative embodiments and related methods of the present disclosure are described below as they might be employed in a system and method for enhancing engine sound and/or vibrations in a hybrid vehicle. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, methods and systems of the present disclosure introduce engine noise and/or vibration into a vehicle compartment when the engine reaches a threshold or maximum RPM, but the electric motor continues to provide additional power to increase vehicle speed. These methods and systems may counter the rubber band-like effect experienced by some individuals when traveling in a hybrid vehicle. In some implementations, the system may activate and begin introducing engine noise or vibration within an "operating region" where the engine has reached some defined threshold RPM and the motor continues to provide motive power, thereby causing the vehicle to continue to increase in speed. To simulate increased engine noise in this operating region, an acoustic tube that acoustically couples the engine compartment to the passenger compartment may be selectively opened to allow increased engine noise to enter the passenger compartment. Alternatively or additionally, vibration may be introduced into the passenger compartment by, for example, activating vibration actuators/mechanisms disposed on the acceleration pedal, vehicle seats, and/or the steering wheel. The noise and/or vibration levels may increase as a function of the vehicle speed.

In other examples, when the vehicle is equipped with active or passive vibrational damping systems for the passenger compartment, the systems may be tuned to provide less damping in a particular operating region, such as, for example, a maximum RPM operating region. In yet other embodiments, a microphone connected to the audio system may be placed in the engine compartment and the engine noise level as a function of vehicle speed could be introduced to the passenger compartment via speakers.

Figure 1:
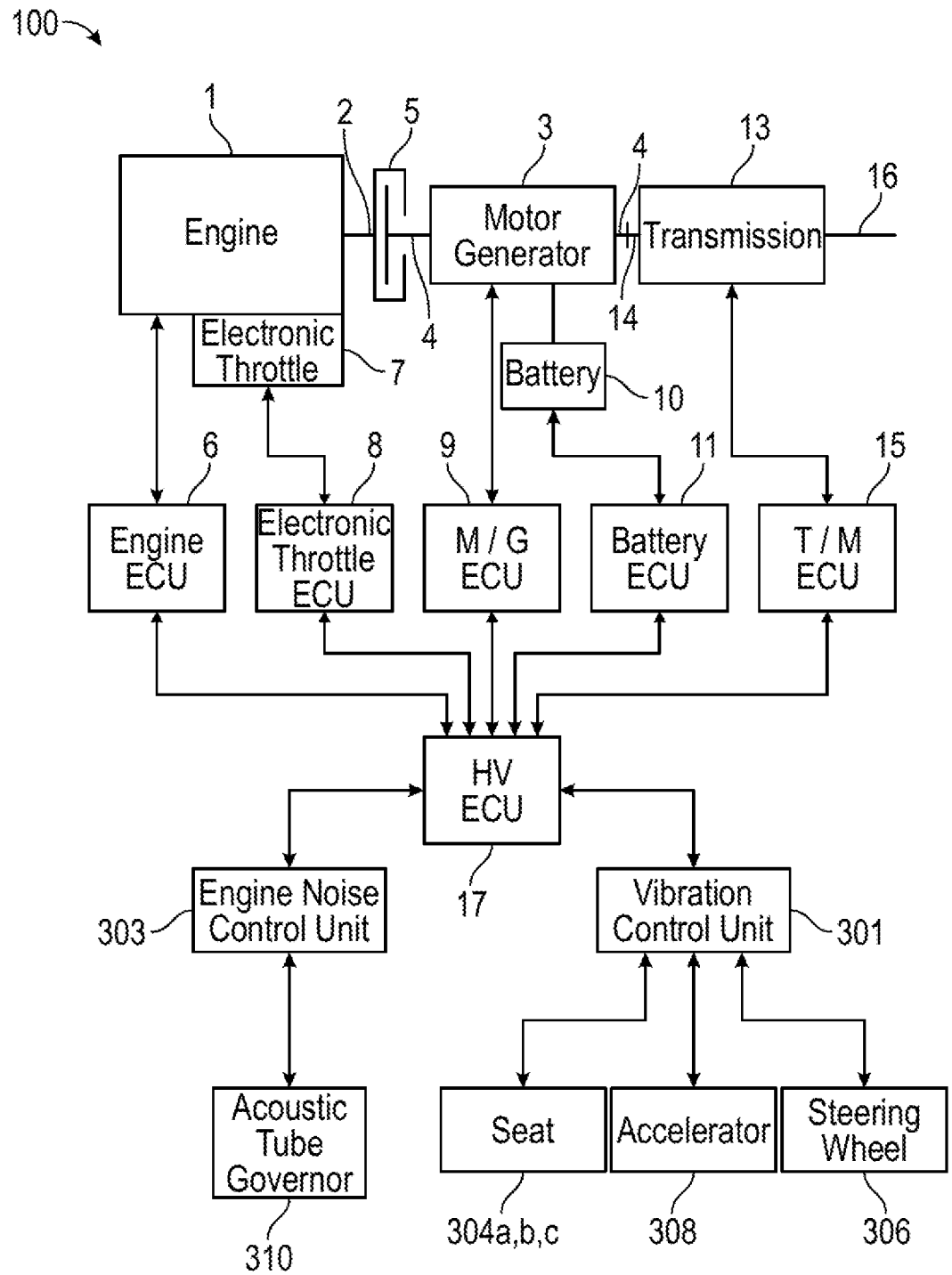
FIG. 1 is a block diagram schematically showing a drive control system for operating a hybrid vehicle, according to the certain illustrative embodiments of the present disclosure.

FIG. 1 is a block diagram schematically showing a drive control system 100 for operating a hybrid vehicle, according to the certain illustrative embodiments of the present disclosure. An internal combustion engine 1 has an output shaft (i.e., a crankshaft) 2 connected to an output shaft 4 of an electric motor/generator 3 through an input clutch 5. This input clutch 5 corresponds to a clutch mechanism and acts as a connection mechanism for connecting those output shafts 2 and 4 selectively. More specifically, the input clutch 5 can be exemplified by a friction clutch of the type, in which friction discs are hydraulically brought into contact with each other to have a transmission torque capacity increased with the oil pressure supplied, and by a wet type multi-disc clutch. In this example, there is provided a control system (not shown) for electrically controlling the feed and release of the oil pressure to and from the input clutch 5.

Engine 1 in the illustrative embodiment shown in FIG. 1 is of the type in which the ignition timing, the fuel feed rate (or fuel injection rate), the idling revolution speed and the valve timings are electrically controlled, and is equipped with an electronic control unit (or engine ECU) 6 for those controls. Electronic control unit 6 is a device constructed mainly of a microcomputer which receives data indicative of, for example, an intake air setting, an accelerator position, an engine water temperature, and an engine RPM to determine and output controlled variables such as the ignition timing on the basis of the pre-stored data and programs and the received data.

Engine 1 may also be equipped with an electronic throttle valve 7 for controlling the throttle opening electrically. This electronic throttle valve 7 is controlled in its degree of opening by the extent of depression of the (not shown) accelerator pedal and by controlled variables which are computed on the basis of the various data such as a driving mode signal (e.g., economy mode, sports mode, normal mode, etc.) selected by a mode selection switch. For this control, there is provided an electronic control unit (e.g., electronic throttle ECU) 8. This electronic control unit 8 is also constructed mainly of a microcomputer.

Electric motor/generator 3 has a structure in which a rotor integrated with the output shaft 4 is rotatably arranged in the inner circumference of a stator having a coil, for example, and which is equipped with a resolver for detecting the RPMs of the rotor. Motor/generator 3 is constructed such that the rotor is rotated back and forth by controlling the power supply to the coil while controlling the torque and such that an electromotive force is generated by rotating the rotor by an external force. In order to control this motor/generator 3, there is provided an electronic control unit (M/G-ECU) 9 which is constructed mainly of a microcomputer. To this electronic control unit 9, there are inputted control data such as the motor RPMs of motor/generator 3.

Further provided is a battery 10 for supplying an electric current to the motor/generator 3 and for reserving the electric power generated by the motor/generator 3. In order to control the discharge and charge of the battery 10, there is provided an electronic control unit (or battery ECU) 11 which is constructed mainly of a microcomputer.

The output shaft 4 of the motor/generator 3 may be connected an input shaft 14 of a transmission 13. The illustrative embodiment as shown in FIG. 1 adopts as the transmission 13 an electronic control type automatic transmission in which a gear ratio is controlled on the basis of the running state/mode. Specifically, transmission 13 is constructed to determine the gear ratio on the basis of the data such as the throttle opening, the vehicle speed, the shift pattern or the shift range and to control the (not shown) frictional engagement unit, such as clutches or brakes, hydraulically so as to establish the determined gear ratio. Although not shown, transmission 13 also includes a vehicle speed sensor (VSS) to determine the vehicle speed, as would be understood by those ordinarily skilled in the art having the benefit of this disclosure. For this hydraulic control, there is provided an electronic control unit (T/M-ECU) 15 which is constructed mainly of a microcomputer.

Moreover, transmission 13 has an output shaft 16 connected to the wheels through the not shown propeller shaft and axles. Therefore, the transmission 13, the propeller shaft connected thereto, and the output shaft 4 of the motor/generator 3 correspond to a power transmission line.

The individual electronic control units 6, 8, 9, 11 and 15 thus far described are connected with a hybrid control unit (HV-ECU) 17 constructed mainly of a microcomputer, that they may transfer the data with one another. This hybrid control unit 17 is constructed to control the driving force of the hybrid vehicle by performing the controls of the application/release and the transmission torque capacity of the input clutch 5, the timing and rate of the fuel feed to the engine 1, the drive/regeneration and the output torque of the motor/generator 3, and the gear ratio of the transmission 13. In short, the hybrid control unit 17 inputs/outputs the data necessary for those controls and is equipped with the programs for processing the data and performing the methods as described herein.

According to the illustrative embodiments described herein, the microcomputers include one or more processors. As described herein, a processor means any device capable of executing machine readable instructions. Accordingly, each processor may be a controller, an integrated circuit, a microchip, a computer, or any other computing device. The memory described herein may be RAM, ROM, a flash memory, a hard drive, or any device capable of storing machine readable instructions.

Embodiments of the present disclosure comprise logic that includes machine readable instructions or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into computer-readable instructions and stored on a non-transitory computer-readable medium. In some implementations, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components. Moreover, the logic can be distributed over various components that are communicatively over a suitable wired or wireless networks.

In certain illustrative embodiments of the present disclosure, the hybrid vehicles described herein are vehicles which have been developed to select prime movers (e.g., combustion engine or electric motor) in accordance with the running state/mode of the hybrid vehicle. For example, in certain modes the illustrative hybrid vehicles may be driven up to a first speed by the output of engine 1 (which may, for example, correspond to a defined threshold engine RPM). Once the first threshold engine RPM is met, hybrid control unit 17 may activate electric motor 3 such that the hybrid vehicle is then driven to a higher speed when demanded. As described herein, when engine 1 meets that threshold RPM, engine 1 no longer generates a corresponding increasing loud engine noise. However, electric motor 3 continues to increase the speed of the hybrid vehicle—thus giving rise to the rubber band-like effect.

Figure 2:
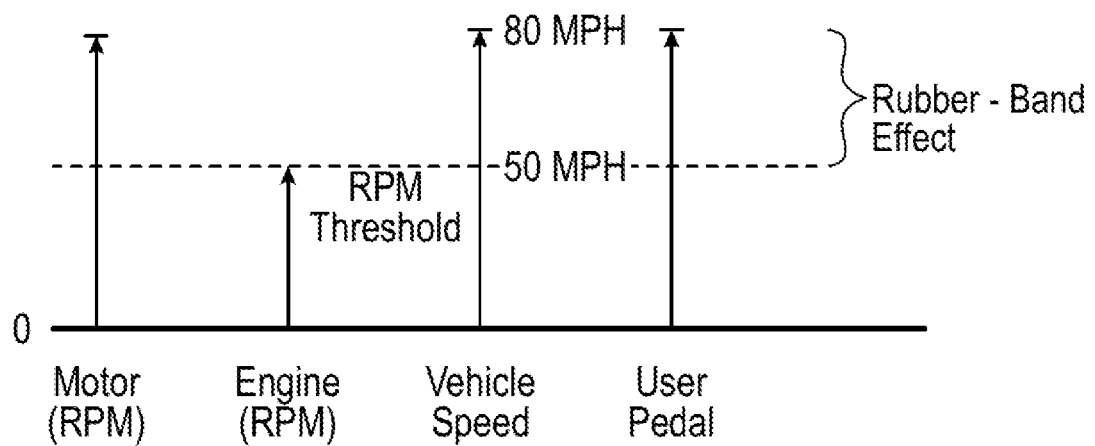
FIG. 2 is a graphic representation of one example of a rubber band-like effect in a hybrid vehicle.

FIG. 2 is a graphic representation of one example of a rubber band-like effect. The electric motor RPM, engine RPM, vehicle speed, and user acceleration pedal are illustrated. When the hybrid vehicle is being operated, the user presses the acceleration pedal to increase the vehicle speed. As the vehicle speed increases to 50 mph in this example, an engine RPM threshold is met. Once met, hybrid control unit 17 begins to further drive the vehicle using electric motor 3 (note in certain examples, below 50 mph, motor 3 may be used to supplement motive power, while in other examples, motor 3 is not activated until 50 mph is reached). As can be seen in the graph, the motor RPM can exceed the engine RPM threshold in this example. Please note the engine RPM threshold can be one of many defined threshold RPMs of engine 1 or may be a true maximum RPM output of engine 1. For example, in a first driving mode, the engine RPM threshold may be 50 mph, while in a second driving mode, the engine RPM threshold may be 75 mph. Nevertheless, once the engine RPM threshold is met, engine 1 no longer outputs an increasingly loud engine noise, even though electric motor 3 continues to drive the vehicle to higher speeds (in response to the continued pressing of the user acceleration pedal). This operating range (in this example, 50-80 mph) is the range of the rubber band-like effect.

Figure 3:
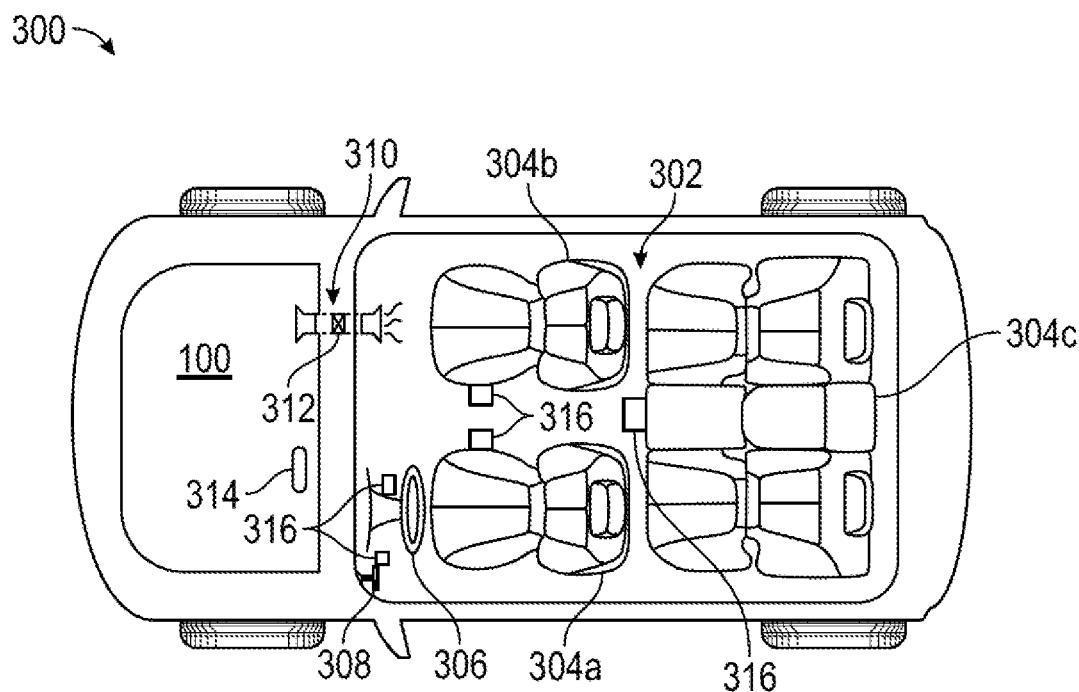
FIG. 3 is a top-side view schematic of a hybrid vehicle, according to certain illustrative embodiments of the present disclosure.

FIG. 3 is a top-side view schematic of a hybrid vehicle 300, according to certain illustrative embodiments of the present disclosure. Hybrid vehicle 300 includes drive control system 100 previously described in FIG. 1. In addition, hybrid vehicle 300 includes a passenger compartment 302 having a plurality of passenger seats 304*a*, 304*b*, and 304*c*, with seat 304*a* being the driver's seat. A steering wheel 306, acceleration pedal 308 and acoustic tube 310 are also illustrated. In this illustrative embodiment, acoustic tube 310 is comprised of a hollow tubing having a governor 312 positioned between opposite ends of tube 310. Acoustic tube 310 acoustically couples engine 1 (represented in FIG. 3 by the drive control system 100) to passenger compartment 302. Acoustic tube 310 may be made of any suitable material (e.g., plastic or other acoustically beneficial materials). Governor 310 may be any variety of electromechanical or other suitable devices used to amplify, reduce, or cancel acoustic waves such as, for example, a baffle, acoustic filter, muffler, etc.

While specific mention has been made hereinabove to possible configurations of hybrid vehicle 300, it should be understood that the listing of vehicle components and/or sensors is non-exhaustive. In addition, hybrid vehicles may include a plurality of sensors used to obtain other measures such as vehicle performance or status including sensors that measure braking loads, steering loads, steering inputs, lateral vehicle loading, payload loads, towing loads, engine operation status, window open status, seat belt status, seat belt usage rate of occupants, turn signal use, and the like. These various quantities may be included in the vehicle operations as described herein.

With reference back to FIG. 1, driver control system 100 also includes an engine noise control unit 303 coupled to hybrid control unit 17. Engine noise control unit 303 is a processor which controls governor 312 of acoustic tube 310 using a wired or wireless communications link (not shown) in order to achieve the features of the present disclosed embodiments. As engine RPM thresholds are met and the vehicle speed continues to increase, engine noise control unit 303 selectively adjusts governor 312 in order to amplify the amount of acoustic waves (i.e., engine noise) allowed into passenger compartment 302. As the speed is reduced, engine noise control unit 303 may also adjust governor 312 in order to reduce the engine noise in like manner. In other words, the amount of engine noise governor 312 allows to travel through acoustic tube 310 may be adjusted as a function of the vehicle speed. Accordingly, the driver is given an audible engine noise indication of vehicle speed.

In some implementations, the threshold RPM may be at or near an engine speed that generates a maximum amount of engine noise (which can be heard by the driver as ambient noise). In some examples, engine noise control unit 303 may set governor 312 to muffle and/or isolate the engine noise as a default state. Once hybrid control unit 17 determines that a threshold engine RPM has been met, governor 312 is activated to begin reducing the amount of muffling, un-isolate, and/or to amplify the acoustic waves as they passes through tube 310. As a result, the driver hears an increased level of engine noise (despite the fact the actual noise being generated by the engine has not increased). Those ordinarily skilled in the art having the benefit of this disclosure realize there are a number of ways in which to design operation of governor 312.

In yet other embodiments, a microphone (not shown) connected to the vehicle audio system may be placed in the engine compartment. The electronic control unit may be communicably coupled to the microphone in order to adjust the level of engine noise picked up by the microphone as a function of vehicle speed. Once engine noise may then be introduced and/or amplified via the vehicle speakers, with the volume controlled via the hybrid control unit 17 in the manner described with reference to the acoustic tube 310 and the governor 312.

Still referencing FIG. 1, driver control system 100 also includes a vibration control unit 301 communicably coupled to hybrid control unit 17 and vibration mechanisms/actuators in driver's seat 304*a*, accelerator pedal 308, and steering wheel 306. Like other control units described herein, vibration control unit 301 is also a processor. With reference to FIG. 3, in certain embodiments, one or more of driver's seat 304a (or the other vehicle seats), steering wheel 306, and accelerator pedal 308 include vibration mechanisms 316 communicably coupled to and controlled by vibration control unit 301. During operation of hybrid vehicle 300, as engine RPM thresholds are met and the vehicle speed continues to increase, vibration control unit 301 activates the vibration mechanisms 316, thus causing one or more of any of the seats 304, steering wheel 306, and accelerator pedal 308 to vibrate. As the speed is reduced, vibration control unit 301 controls the vibration mechanisms 316 to reduce the amount of vibration. Thus, vibration control unit 301 adjusts the amount of vibration as a function of the vehicle speed. Accordingly, a tactile sensation is felt by the driver, thereby giving the driver the sensation that the vehicle speed is increasing and/ or decreasing. Although different types of vibration mechanisms 316 may be used, some examples include pneumatic actuator mechanisms, motor actuators, piezoelectric actuators, and others.

With reference to FIG. 3, driver control system 100 may also include a vibration damping system 314, also communicably coupled to hybrid control unit 17. In an alternative embodiment, when an engine RPM threshold is met and the speed continues to increase, hybrid control unit 17 may deactivate vibration damping system 314 or reduce its damping functions, thereby increasing vibration as the vehicle speed increases. In like manner, hybrid control unit 17 may reduce vibration by re-activating vibration damping system 314 or increasing its damping function when the vehicle speed is reduced to reduce vibration felt by vehicle occupants.

Figure 4:
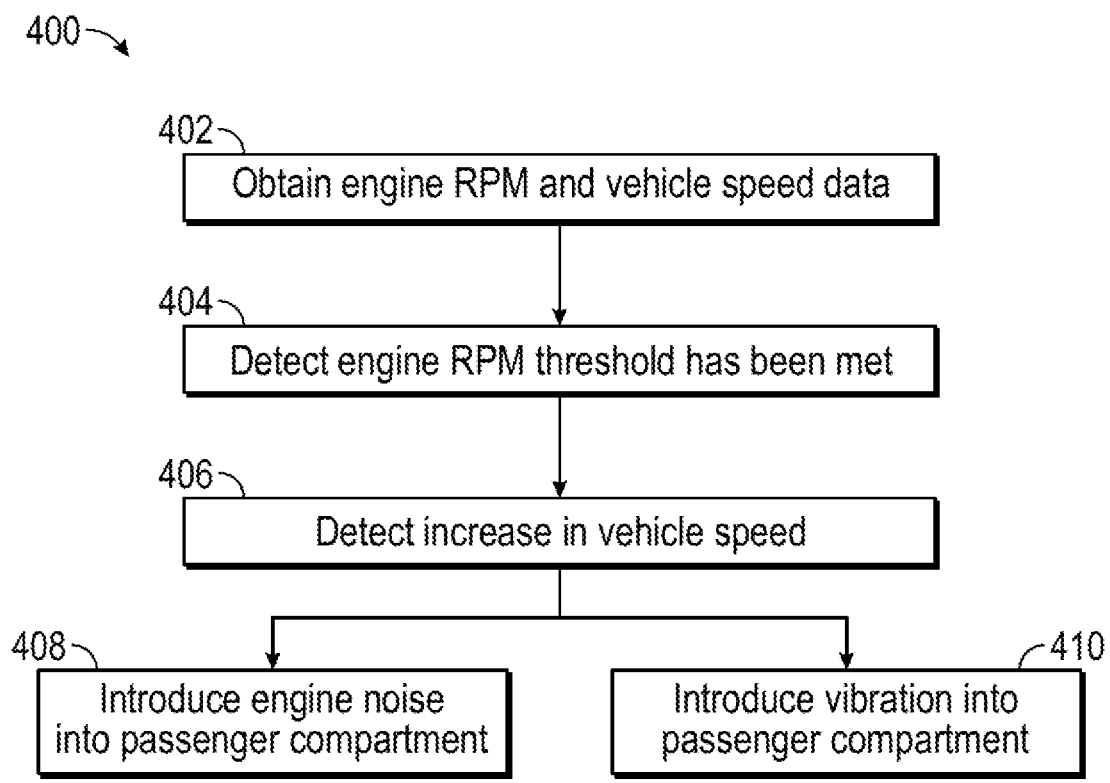
FIG. 4 is a flow chart of a method for operating a hybrid vehicle, according to an illustrative method of the present disclosure.

FIG. 4 is a flow chart of a method 400 for operating a hybrid vehicle, according to an illustrative implementation of the present disclosure. The hybrid vehicle may be any of the hybrid vehicles described herein having an internal combustion engine and electric motor. At block 402, the electronic control unit obtains engine RPM and vehicle speed data during operation of the hybrid vehicle. As the user continues to press the acceleration pedal to thereby increase speed, a pre-defined engine RPM threshold is met and detected by the electronic control unit at block 404. At block 406, as the electronic control unit continues to monitor engine related data, the electronic control unit detects a signal indicating an increase in the vehicle speed after the engine RPM threshold has been met. This increase in vehicle speed is caused by the activation or continued operation of the electric motor to further power the vehicle after the engine RPM threshold has been exceeded. In response to the increase in vehicle speed beyond the engine RPM threshold as detected by the engine control unit at block 406, the engine control unit introduces engine noise into the passenger compartment through the acoustic tube, as described herein. Alternatively, or in conjunction, the electronic control unit also introduces vibration into the passenger compartment, as described herein.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A computer-implemented method for operating a hybrid vehicle having an internal combustion engine and electric motor, the method comprising:
   during operation of a hybrid vehicle, obtaining engine revolutions per minute ("RPM") and vehicle speed data using a hybrid control unit;
   determining an engine RPM threshold has been met based on the obtained RPM or vehicle speed data;
   receiving a signal indicating a vehicle speed increase after the engine RPM threshold has been met, the increase in the vehicle speed being caused by the electric motor; and
   in response to the increase in vehicle speed beyond the engine RPM threshold, performing at least one of the following operations:
      introducing engine noise into a passenger compartment of the vehicle through an acoustic tube which acoustically couples the engine to the passenger compartment; or
      introducing vibration into the passenger compartment.

2. The computer-implemented method as defined in claim 1, further comprising adjusting an amount of engine noise allowed to travel through the acoustic tube as a function of the vehicle speed.

3. The computer-implemented method as defined in claim 1, further comprising adjusting an amount of vibration introduced into the passenger compartment as a function of the vehicle speed.

4. The computer-implemented method as defined in claim 1, wherein the vibrations are introduced using vibration mechanisms positioned inside the passenger compartment.

5. The computer-implemented method as defined in claim 1, wherein introducing the vibrations comprises causing a vehicle steering wheel to vibrate.

6. The computer-implemented method as defined in claim 1, wherein introducing the vibrations comprises causing a vehicle acceleration pedal to vibrate.

7. The computer-implemented method as defined in claim 1, wherein introducing the vibrations comprises causing a vehicle seat to vibrate.

8. The computer-implemented method as defined in claim 1, wherein introducing the vibration comprises reducing damping function of a vehicle vibration damping system.

9. A system for operating a hybrid vehicle, the system comprising:
   an internal combustion engine and electric motor;
   a non-transitory memory; and
   one or more hardware processors coupled to the engine, electric motor, and non-transitory memory and configured to read instructions from the non-transitory memory to cause the system to perform operations comprising:
      during operation of the hybrid vehicle, obtaining engine revolutions per minute ("RPM") and vehicle speed data;
      determining an engine RPM threshold has been met based on the obtained RPM or vehicle speed data;
      receiving a signal indicating a vehicle speed increase after the engine RPM threshold has been met, the increase in the vehicle speed being caused by the electric motor; and
      in response to the increase in vehicle speed beyond the engine RPM threshold, performing at least one of the following operations:

introducing engine noise into a passenger compartment of the vehicle through an acoustic tube which acoustically couples the engine to the passenger compartment; or introducing vibration into the passenger compartment.

10. The system as defined in claim 9, wherein the acoustic tube comprises a governor to adjust an amount of engine noise traveling through the acoustic tube as a function of the vehicle speed.

11. The system as defined in claim 9, further comprising the operation of adjusting an amount of vibration introduced into the passenger compartment as a function of the vehicle speed.

12. The system as defined in claim 9, further comprising a vibration mechanism positioned inside the passenger compartment.

13. The system as defined in claim 12, wherein the vibration mechanism is positioned on a vehicle steering wheel.

14. The system as defined in claim 12, wherein the vibration mechanism is positioned on a vehicle acceleration pedal.

15. The system as defined in claim 12, wherein the vibration mechanism is positioned on a vehicle seat.

16. The system as defined in claim 9, wherein introducing the vibration comprises the operation of reducing a damping function of a vehicle vibration damping system.

17. A non-transitory computer-readable medium having stored thereon machine-readable instructions executable to cause a machine to perform operations comprising:

during operation of a hybrid vehicle, obtaining engine revolutions per minute ("RPM") and vehicle speed data using a hybrid control unit;

determining an engine RPM threshold has been met based on the obtained RPM data or vehicle speed data;

receiving a signal indicating a vehicle speed increase after the engine RPM threshold has been met, the increase in the vehicle speed being caused by the electric motor; and in response to the increase in vehicle speed beyond the engine RPM threshold, performing at least one of the following operations:

introducing engine noise into a passenger compartment of the vehicle through an acoustic tube which acoustically couples the engine to the passenger compartment; or introducing vibration into the passenger compartment.

18. The non-transitory computer-readable medium as defined in claim 17, wherein the engine noise or vibration are introduced as a function of vehicle speed.

19. The non-transitory computer-readable medium as defined in claim 17, wherein the vibrations are introduced using vibration mechanisms positioned on at least one of a steering wheel, acceleration pedal, or vehicle seat.

20. The non-transitory computer-readable medium as defined in claim 17, wherein introducing the vibration comprises reducing damping of a vehicle vibration damping system.

* * * * *